United States Patent
Choe

(10) Patent No.: US 6,584,504 B1
(45) Date of Patent: Jun. 24, 2003

(54) METHOD AND APPARATUS FOR MONITORING INTERNET TRAFFIC ON AN INTERNET WEB PAGE

(75) Inventor: Kerry M. Choe, Brooklyn, NY (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 09/579,777

(22) Filed: May 26, 2000

(51) Int. Cl.⁷ .......................... G06F 15/173; G09G 5/00
(52) U.S. Cl. .................. 709/224; 709/223; 709/225; 709/226; 345/736; 345/733; 345/737
(58) Field of Search ................... 709/224, 203; 702/176; 725/125; 370/338, 230; 345/736

(56) References Cited

U.S. PATENT DOCUMENTS

| | | | | |
|---|---|---|---|---|
| 5,867,764 A | * | 2/1999 | Williams | 725/125 |
| 6,055,491 A | * | 4/2000 | Biliris et al. | 702/176 |
| 6,078,956 A | * | 6/2000 | Bryant et al. | 709/224 |
| 6,393,479 B1 | * | 5/2002 | Glommen et al. | 709/224 |
| 6,452,915 B1 | * | 9/2002 | Jorgensen | 370/338 |
| 6,502,131 B1 | * | 12/2002 | Vaid et al. | 709/224 |
| 6,513,060 B1 | * | 1/2003 | Nixon et al. | 709/203 |

OTHER PUBLICATIONS

Peter Ness. PingPlotter About Pages. Apr. 21, 2000. http://www.pingplotter.com v2.20 beta 3 p. 1–24.*
www.digibuy.com, Enhanced Ping by SolarWinds.Net.

* cited by examiner

Primary Examiner—Ayaz Sheikh
Assistant Examiner—Christian La Forgia
(74) Attorney, Agent, or Firm—Silicon Valley IP Group; Kevin J. Zilka; Christopher J. Hamaty

(57) ABSTRACT

A computer program product enables a computer device to implement a method of monitoring Web page traffic. The multi-step method begins by automatically sending a first ping at a first time to a first Internet address associated with a first Web page. A first response time for the first ping is measured to determine a first level of Internet traffic on the first Web page. Using the first response time, a first value is assigned to a perceptible characteristic of a first graphical object, which is then displayed on a display device associated with the computer device. Next, a second ping is automatically sent to the first Internet address at a second time. The second response time to the second ping is measured to determine a second level of Internet traffic on the first Web page. Based on the second response time a second value is assigned to the perceptible characteristic of the first graphical object, which is then redisplayed on the display device.

20 Claims, 8 Drawing Sheets

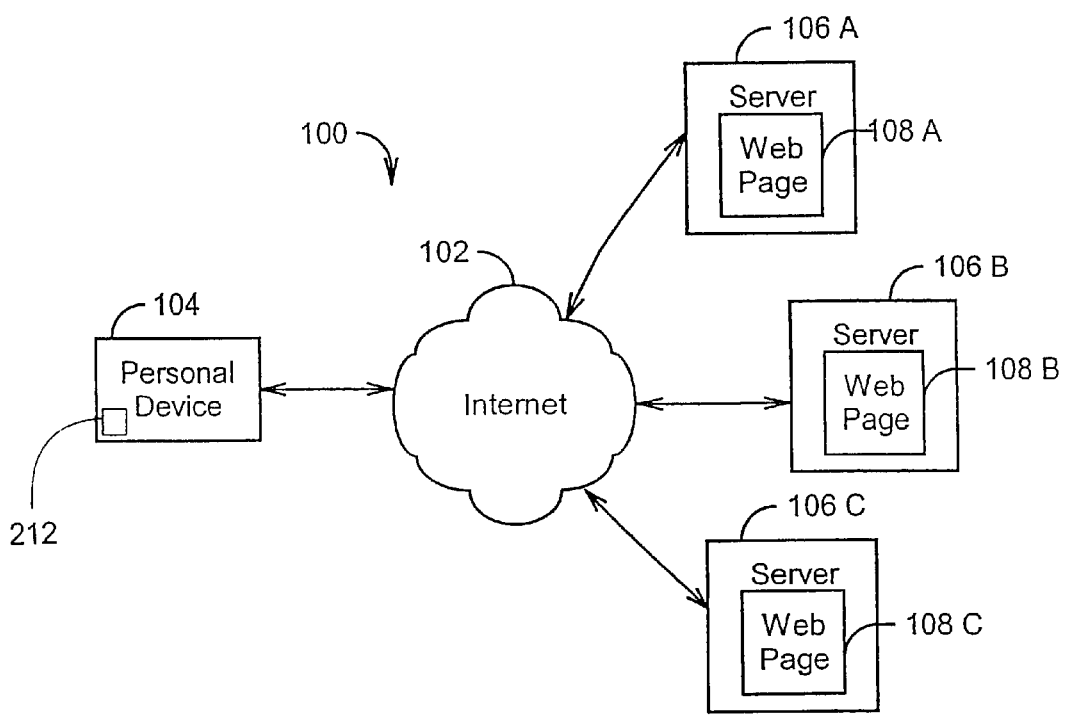
Fig. 1

METHOD AND APPARATUS FOR MONITORING INTERNET TRAFFIC ON AN INTERNET WEB PAGE

FIELD OF THE INVENTION

The invention relates to a method and apparatus for monitoring the Internet. In particular, the present invention relates to a computer program product and method for monitoring Internet traffic on a Web page.

BACKGROUND OF THE INVENTION

As the number of people accessing the Internet increases, so too does Internet traffic. Internet traffic tends to concentrate on a few popular Web sites or Web pages. The access time associated with retrieving a Web page increases when multiple users simultaneously attempt to access the same Internet Web page. At times, the number of users attempting to access an Internet Web page may be so great that many users will be unable to gain access at all.

One method of responding to a denial of service is simply to repeatedly attempt to log-on to the desired Web page until access is granted. While this method is both simple and effective, it is also time consuming and frequently frustrating. Furthermore, once a user has successfully gained access to a busy Web site or Web page, the user has no way of knowing the level of Internet traffic on the Web page. The level of Internet traffic is on an Internet Web page effects the operating speed and efficiency with which a user can accomplish a task or conduct business on that Web page.

Internet users are accustomed to interacting with the Internet using a graphical user interface ("GUI"). A GUI is an interface that uses both text and images to convey information. Using GUIs, a typical Internet user is trained to quickly scan gross information to determine whether to access the more detailed information associated with a Web page, Web site, icon, or message.

SUMMARY OF THE INVENTION

The apparatus and method of the present invention allow Internet users to avoid long delays associated with busy Web sites and Web pages by monitoring Internet traffic on a preselected list of Web pages. The method of the present invention begins with user selections of a Web page to be monitored. At a first time, a first ping is automatically sent to the selected Web page's Internet address. The first ping's response time is measured to determine the Web page's level of Internet traffic. This level of Internet traffic is then used to assign a value to a perceptible characteristic of a graphical object, which is then displayed on a display device. At a second time, a second ping is automatically sent to the selected Web page's Internet address. The response time for the second ping is then measured to determine the Web page's level of Internet traffic. This second level of Internet traffic is then used to assign a second value to the perceptible characteristic of the graphical object, which is then redisplayed.

The apparatus and method of the present invention allow a user to monitor Internet traffic on Internet Web pages without logging on to the Internet Web page.

DESCRIPTION OF THE DRAWINGS

For a better understanding of the invention, reference should be made to the following detailed description taken in conjunction with the accompanying drawing(s), in which:

FIG. 1 shows an overview of a system for assisting a user in browsing the Internet.

Like reference numerals refer to corresponding parts throughout the drawing(s).

DETAILED DESCRIPTION OF THE INVENTION

FIG. 1 illustrates, in block diagram form, System 100. System 100 enables a user to browse Internet 102 using Personal Device 104. Personal Device 104 includes Instructions 212 of the present invention. Instructions 212 enable Personal Device 104 to automatically monitor the level of traffic on selected Web pages and to communicate that information to the user without requiring the user to launch an Internet browser. Thus, the user may avoid unacceptable traffic on the selected Web pages.

A. Overview of the System and Personal Device

Referring still to FIG. 1, Internet 102 couples together Servers 106A–C and Personal Device 104. Each remote Server 106A–C is bi-directionally coupled to Internet 102 and hosts a multiplicity of Web sites and Web pages 108A–C. Often Personal Device 104 will be denied access to a target Web page, or access will be very slow, because of substantial Internet traffic on the target Web page. Instructions 212 enable the user of Personal Device 104 to avoid the problems associated with heavy Internet traffic on a target Web site by monitoring Internet traffic on target Web pages and providing a user with graphical information describing the amount of Internet traffic on target Web pages.

Personal Device 104 may be, but is not limited to, a computer, a hand held communication device such as a computer, a Palm Pilot®, a Wizard®, an Internet ready pager, an Internet ready telephone, or the like. Personal Device 104 is bi-directionally connected to the Internet 102, such that it can send and receive signals from the Internet 102. From this bi-directional connection, Personal Device 104 can request and receive information from any of a variety of Web pages, such as Web pages 108A–C.

Figure 2:
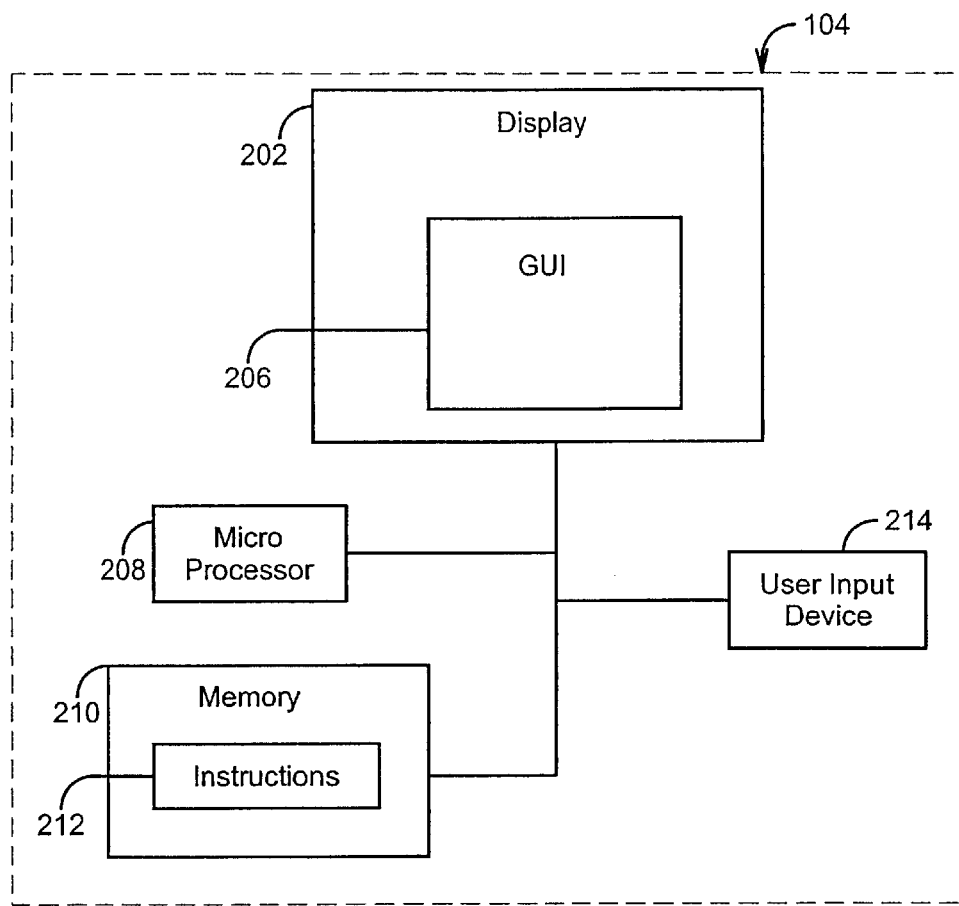
FIG. 2 shows is a block diagram of a user's personal device.

FIG. 2 illustrates, in block diagram form, Personal Device 104, which includes Display 202, Microprocessor 208, Memory 210 and User Input Device 214. Display 202 enables Personal Device 204 to visually display information to the user. Preferably, information is displayed using a Graphical User Interface ("GUI") 206. A GUI displays information in both text and image formats. An advantage of using a GUT over a text-based interface is that users perceive image or mixed text/image information more readily than pure textual information. One skilled in the art would be familiar with any of a number of GUI applications such as the MACINTOSH, PC with WINDOWS, or PC with OS/2 GUI applications.

Microprocessor 208 controls the operation of Personal Device 104 by executing Instructions 212 stored in Memory 210, in accordance with input received from User Input Device 214. Memory 210 may be, but is not limited to, solid state memory devices such as Read Only Memories (ROM), Random Access Memories (RAM), Dynamic Random Access Memories (DRAM), Programmable Read Only Memories (PROM), Erasable Programmable Read Only Memories (EPROM), or Electrically Erasable Programmable Read Only Memories (EEPROM), such as flash memories. Instructions 212, may be a computer program that includes the steps described in accordance with a preferred embodiment, and may include variables input via User Input Device 214. Instructions 212 will be described in detail with respect to FIGS. 3–8.

User Input Device 214 allows a user to interact with Instructions 212. User Input Device 214 may be any of a number of user input devices known in the art, for example a key board, a mouse, a roller ball, a voice activated input device, a sound activated input device, or the like.

B. Overview of the Internet Monitoring Instructions

Figure 3:
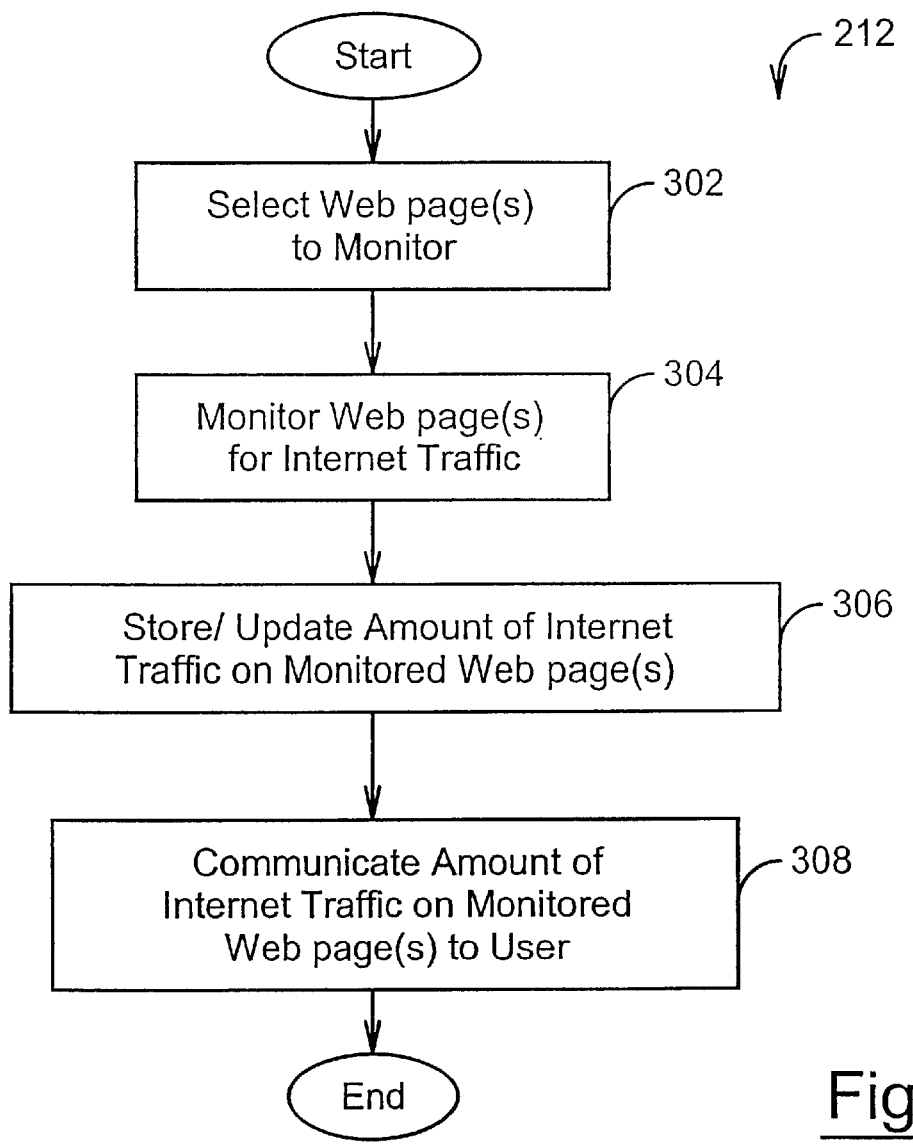
FIG. 3 is a flow diagram showing the steps performed in accordance with a preferred embodiment.

FIG. 3 is a flow diagram illustrating the steps performed by Instructions 212, which are stored in Memory 210. During step 302, one or more Web pages 108A–C are selected for monitoring. This selection may be made in any number of ways. For example, using a User Input Device 214, a user may select target Web page(s) on the fly. In this way, a user may also change target Web page(s) on the fly. Alternatively, the Web pages to be monitored may be automatically selected by Microprocessor 208 from the last several Web pages visited by the user or the most frequently visited Web pages. Still another method of selecting target Web pages is allowing a computer program to select target Web pages 108A–C from among the user's bookmarked list of favorites. Bookmarks hold the Internet Address for a user's favorite Web pages. An additional method of selecting target Web page(s) 108A–C is allowing a computer program to create a list of target Web pages from the hypertext links embedded in a Web document. Typically, hypertext links 704 (shown in FIG. 7) link a Web document to another page in the same document, or to a Web page at an entirely different Internet address. In refining options, it may make sense to monitor only those Web pages at an entirely different Internet address. In addition to the above discussed methods for selecting target Web pages to monitor, other methods for selecting target Web pages to monitor may be used in conjunction with the present invention.

Referring again to FIG. 3, during step 304, the selected Web page(s) 108A–C are automatically monitored for Internet Web traffic. In a preferred embodiment, the selected Web page(s) 108A–C are monitored by automatically sending pings from Personal Device 104, across the Internet 102, to the target Web page(s) 108A–C. As used herein, "ping" refers to a timed request and echo reply packet used to probe the distance to a target. In this case, the timed request is a request to an Internet Web page, and the distance is represented by the echo reply in a measure of the Internet traffic on one or more target Web pages. The timed request may be sent according to a mathematical distribution performed at Microprocessor 208, such as, but not limited to, a predetermined constant time interval, a Gaussian distribution, a White Noise distribution, a Poisson distribution, or the like. In the case where there is more than one target Web page, it is intended that pings may be sent either serially or simultaneously to each target Web page.

During step 306, Microprocessor 208 records in Memory 210 the time interval between sending each ping and reception of the corresponding echo reply. The amount of Internet traffic is updated with each successive ping.

During step 308, the amount of Internet traffic on target Web page(s) 108A–C is communicated to the user by displaying and updating graphical objects representing the amount of Internet traffic on Display 202 in a GUI 206. A GUI is a graphical user interface that uses both text and images to convey information. A graphical object is a shape such as a rectangle, circle, square, hand, or pointer, that is displayed in the GUI, and may be used to convey information. A graphical object can convey information by, for example, altering visually perceptible characteristics such as size, shape, or color, or by altering audibly perceptible characteristics linked to an image such as pitch, tone, or sound.

Figure 6:
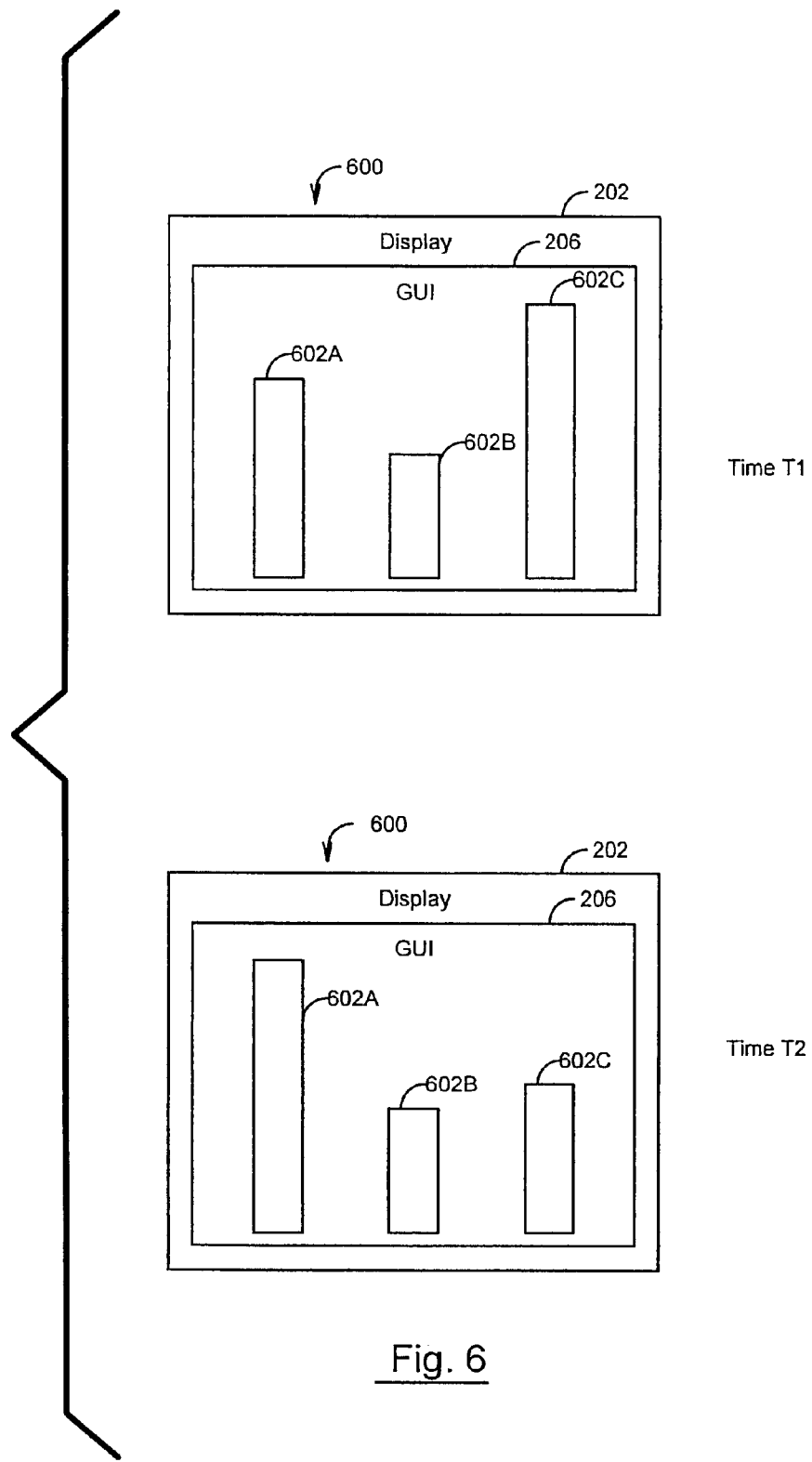
FIG. 6 is an example of a GUI displaying the amount of Internet traffic on Internet Web pages at time $T_1$ and $T_2$.

FIG. 6 illustrates an example using GUI 206 to communicate to a user the changes in Internet traffic. Graphical Objects 602A–C are vertical bars providing a graphical representation of the amount of Internet traffic on Web pages 108A–C at time $T_1$ and $T_2$. Graphical Objects 602A–C are updated according to the change in Internet traffic as measured by subsequent pings at time $T_1$ and $T_2$, and as stored in Memory 210. In accordance with an alternative preferred embodiment, the GUI 206 appears reduced and placed in a corner, for example the lower right-hand corner, of the display 202. In this manner, the user may periodically view the GUI 206 out of the corner of her eye while otherwise going about her on-screen business. A noticeable reduction in size of a particular bar element 602A, 602B, or 602C will conveniently trigger a recognition in the user's mind that the corresponding web site is now giving faster response times.

Figure 7:
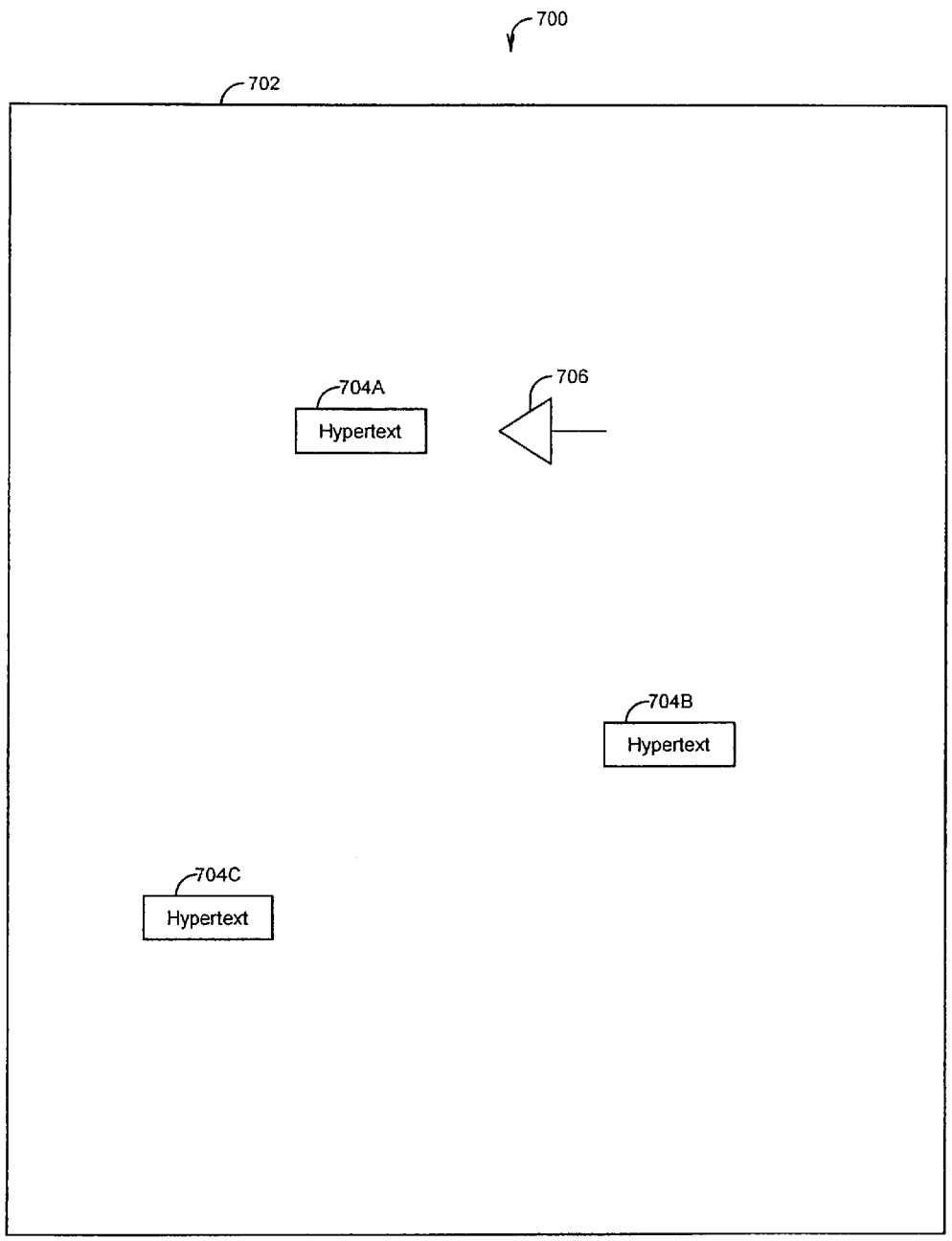
FIG. 7 is an example of a document containing hypertext, as used in connection with a preferred embodiment.

FIG. 7 illustrates an example of a different way of using graphical objects to communicate the amount of Internet traffic on target Web pages. In FIG. 7, Web Document 702 contains Hypertext links 704A–C. Each Hypertext link 704A–C may provide a link to an entirely different Web page, in which case, each Hypertext link 704A–C may be designated as a target Web page 108A–C for monitoring. In this example, Pointing Icon 706 is a graphical object that may be moved via user manipulation of a user input device, such as a mouse. Pointing Icon 706 may be positioned across, or on top of, a Hypertext link 704A–C, and may change a perceptible characteristic to communicate to a user the level of Internet traffic on the target Web page associated with Hypertext link 704A–C. For example, Pointing Icon 706 may change in color, size or shape according to the amount of Internet traffic on a target Web page. Alternatively, Personal Device 104 may emit an audible pitch, tone, or sound according to the amount of Internet traffic at a target Web page. Other GUI representations for displaying the amount of Internet traffic on target Web page(s) 108A–C are consistent with the present invention.

C. A First Method of Monitoring Internet Traffic

Figure 4:
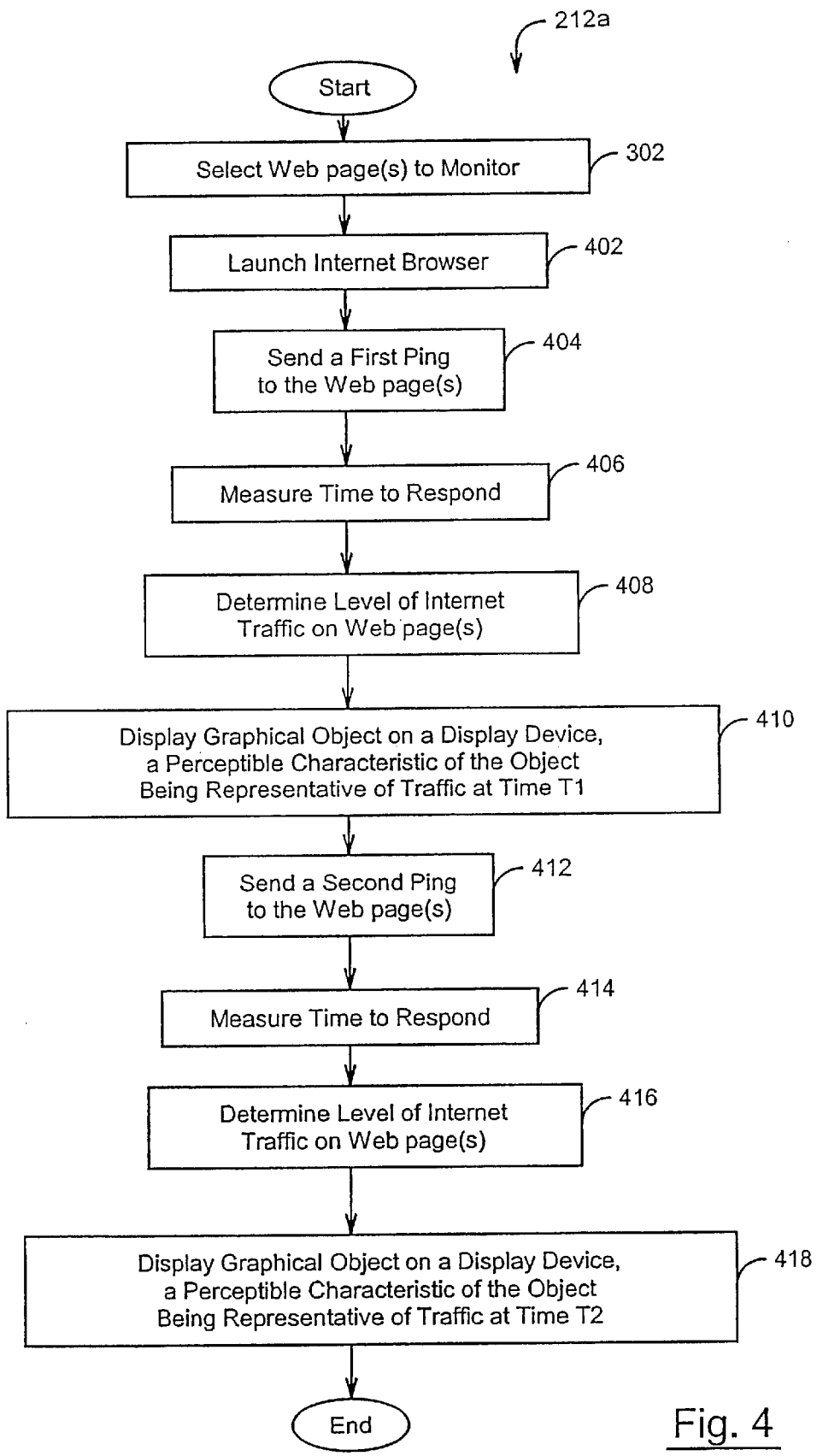
FIG. 4 is a flow diagram showing the steps performed in accordance with another preferred embodiment.

FIG. 4 is a flow diagram illustrating the steps of Instructions 212a, a first embodiment of Instructions 212. Instructions 212a are stored in Memory 210. Instruction 212a begin with step 302, selecting target Web page(s) 108A–C to monitor. During step 402, Microprocessor 208 automatically launches an Internet browser, connecting Personal Device 104 to Internet 102. An Internet browser may be launched in any number of ways. For example, an Internet browser may be automatically launched at Personal Device 104 power-up, automatically launched at specific times of day, launched on demand by a user, upon selecting a designated piece of hypertext in a document or email message, or the like. Once an Internet browser is launched, a user has on-line access to Internet 102.

During step 404, Microprocessor 208 sends a first ping to target Web page(s) 108A–C. There may be one or more selected target Web pages. Each target Web page has an associated Internet Address. A first ping is sent at a first time to each of the Internet Addresses respectively associated with each of the target Web pages. In the event there is more than one target Web page, a first ping may be sent to each target Web page serially or simultaneously. This ping is sent in a packet which may vary in size according to a user's preferences or may be pre-set in Instructions 212. Also, the first ping is sent at time $T_1$ according to a mathematical distribution, as discussed above.

During step 406, the ping packet's time to respond is measured. Microprocessor 208 measures the time to respond as the difference between the time the ping was sent by Personal Device 104 and the time the echo reply is received at Personal Device 104. The result of this measurement is stored in Memory 210.

During step 408, Microprocessor 208 uses the time to respond data stored in Memory 210, as determined in step 406. Using this time to respond data, Microprocessor 208 determines the level of Internet traffic on target Web page(s) 108A–C. The level of Internet traffic on target Web pages may be determined according to any of a number of algorithm or subroutines. A typical algorithm or subroutine may include variables such as: an average time to respond for a particular Web page, an average time to respond for all Web pages, the number of hops a ping takes on a route, multiplied by an average amount of time per hop, ping time not attributable to ping travel, etc.

During step 410 Microprocessor 208 applies a value determined for the level of Internet traffic on the target Web pages at time $T_1$ to the graphical objects in GUI 206. These graphical objects may be the Bars 602A–C (See FIG. 6), they may be Pointing Icon 706 (See FIG. 7), or any other graphical object in a GUI used to convey information to a user. This value is used to assign a perceptible characteristic of the graphical objects in GUI 206. The value may be assigned to any perceptible characteristic that may be linked to a graphical object. Once the value is assigned to the graphical objects, the graphical objects are displayed to the user via GUI 206.

During step 412, Microprocessor 208 automatically sends a second ping at a second time, time $T_2$, to target Web page(s) 108A–C. As with the first ping, the second ping is sent according to a mathematical distribution such as a predetermined constant time interval, a Gaussian distribution, a White Noise distribution, a Poisson distribution, or the like. The time to respond to the second ping is measured during step 414, and the level of Internet traffic on the target Web page(s) at the time of the second ping is determined in step 416. During step 416, Microprocessor 208 receives the time to respond data for the second ping as determined in step 414. Using this second ping time to respond data, Microprocessor 208 determines the level of Internet traffic on target Web page(s) 108A–C. During step 418, Microprocessor 208 applies a second value determined for the level of Internet traffic on the target Web pages at Time T2 to the graphical objects in GUI 206. This second value is used to update a perceptible characteristic of the graphical objects in GUI 206.

D. A Second Method of Monitoring Internet Traffic

Figure 5:
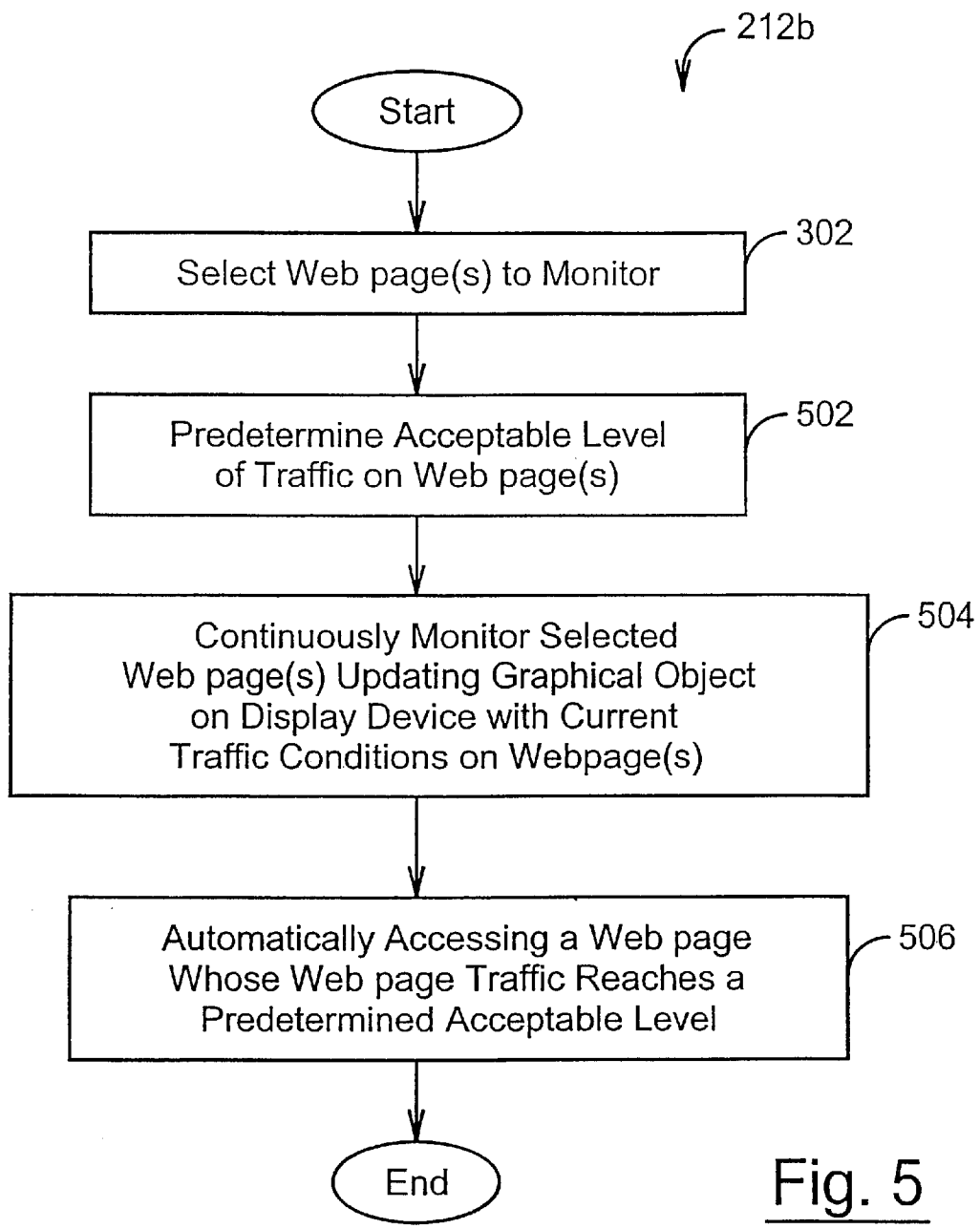
FIG. 5 is a flow diagram showing the steps performed in accordance with a further preferred embodiment.

FIG. 5 is a flow diagram illustrating the steps of Instructions 212b, which are a second embodiment of Instructions 212. First, during step 302, target Web page(s) 108A–C are selected for monitoring.

Next, during step 502 the user indicates an acceptable level of Internet traffic on target Web page(s) 108A–C. This acceptable level of Internet traffic is the level of Internet traffic below which a user would want to log onto a Web page. The variable for assigning the acceptable level of Internet traffic may be a variable input via the User Input Device 214, each time a user accesses a computer program containing Instructions 212. Alternatively, the variable may be permanently set by a user, by a programmer, or on the fly. Also, in cases where there exist more than one target Web page, a different acceptable level of Internet traffic may be established for each target Web page.

During step 504, target Web page(s) 108A–C are continuously monitored, and GUI 206 is continuously updated and displayed according to the new value of Internet traffic at each successive ping, where each successive ping is sent at time $T_n$, according to a mathematical distribution.

During step 506, Microprocessor 208 compares the acceptable level of Internet traffic on target Web page(s) 108A–C to the actual level of Internet traffic as measured at time $T_n$. Microprocessor 208 automatically sends a request signal logging Personal Device 104 onto a target Web page when the actual level of Internet traffic on that target Web page reaches an acceptable level of Internet traffic as defined or set in step 502.

E. A Third Method of Monitoring Internet Traffic

Figure 8:
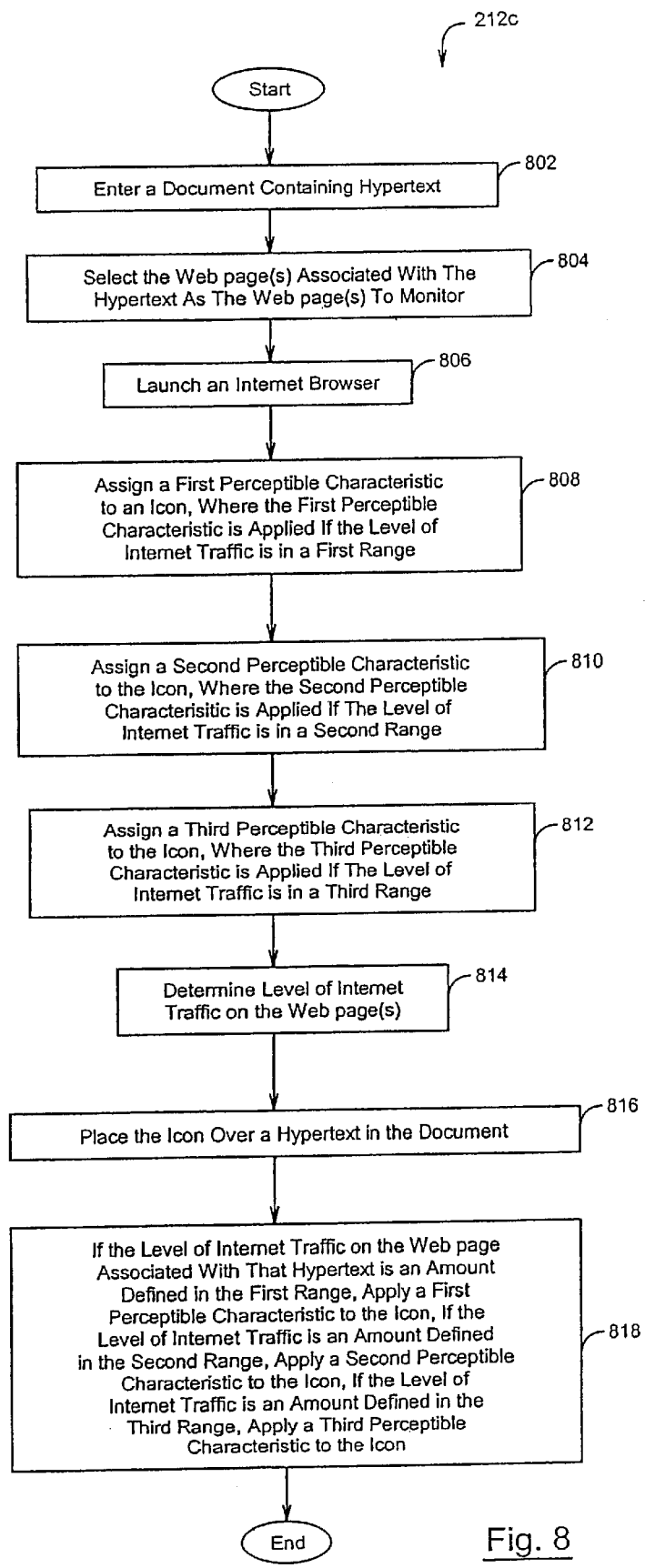
FIG. 8 is a flow diagram showing the steps performed in accordance with another preferred embodiment.

FIG. 8 is a flow diagram illustrating the steps of Instructions 212c, a third embodiment of Instructions 212. During step 802, a user enters a document, such as Document 702, containing Hypertext links 704A–C (see FIG. 7). A document containing hypertext links may be generated in any number of ways including, but not limited to, via email programs such as MSMail®, HotMail®, or GroupWise®, word processing programs such as Microsoft Word® or Word Perfect®, using programs such as Adobe Acrobat®, or creating Web page documents. Once a document is entered, during step 804 Microprocessor 208 identifies Hypertext 704A–C according to Instructions 212. Hypertext 704A–C includes Internet addresses linking the hypertext to specific Web pages. Microprocessor 208 uses the hypertext Internet address information to select target Web pages 108A–C. At step 806, Microprocessor 208 launches an Internet browser.

During step 808 a first range of Internet traffic is identified such that if the Internet traffic on a target Web page falls within a first range, Microprocessor 208 associates a first perceptible characteristic with Pointing Icon 706. Thus, if, for example, a first range of Internet traffic is set for between one and five, and the actual amount of Internet traffic determined by Microprocessor 208 is three, then a first perceptible characteristic will be assigned to Pointing Icon 706, and by perceiving that perceptible characteristic, a user will know within a specified range how much Internet traffic is on a target Web page.

During step 810 a second range of Internet traffic is identified such that if the Internet traffic on a target Web page falls within a second range, Microprocessor 208 associates a second perceptible characteristic to Pointing Icon 706. Thus, if, for example, a second range of Internet traffic is set for between five and ten, and the actual amount of Internet traffic determined by Microprocessor 208 is seven, then a second perceptible characteristic will be assigned to Pointing Icon 706.

Similarly, during step 812 a third range of Internet traffic is identified such that if the Internet traffic on a target Web page falls within a third range, Microprocessor 208 associates a third perceptible characteristic to Pointing Icon 706.

During step 814 Microprocessor 208 determines the level of Internet traffic on target Web pages 108A–C, storing these results in Memory 210. During step 816, a pointing icon is placed over a hypertext link in a document. For example, Pointing Icon 706 may be placed over one of the Hypertext links 704A–C in Document 702 (see FIG. 7). Once the pointing icon is placed, during step 818 Microprocessor 208 compares the level of Internet traffic on the Web page associated with the indicated hypertext link with the earlier established ranges of Internet traffic. If the actual level of Internet traffic on a target Web page is within a first established range of Internet traffic, a first perceptible characteristic is applied to Pointing Icon 706. If the actual level of Internet traffic on a target Web page is within a second established range of Internet traffic, a second perceptible characteristic is applied to Pointing Icon 706. And, if the actual level of Internet traffic on a target Web page is within a third established range of Internet traffic, a third perceptible characteristic is applied to Pointing Icon 706. In this way, a user can browse different pages on the Internet and have information about the amount of Internet traffic on hypertext linked Web pages before attempting to enter a linked Web page.

F. Alternate Embodiments

For purposes of explanation, the foregoing description used specific nomenclature to provide a thorough understanding of the invention, however, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are neither intended to be exhaustive nor to limit the invention to the precise forms disclosed. Obviously, many modifications and variations are possible in view of the above teachings. For example, one obvious variation is to practice the teachings disclosed herein on an Intranet. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer program product to enable a computer device to implement a method of monitoring Web page traffic, the computer device including a display device, the method comprising:
   a. automatically sending a first ping at a first time to a first Internet address associated with a first Web page in response to a determination that a pointing icon points to a hypertext link including the first Internet address associated with the first Web page;
   b. measuring a first response time to the first ping to determine a first level of Internet traffic on the first Web page;
   c. assigning a first value to a perceptible characteristic of a first graphical object, the first value representing the first level of Internet traffic;
   d. displaying on the display device the first graphical object for identifying an amount of Web page traffic associated with the hypertext link prior to the selection thereof via the pointing icon;
   e. automatically sending a second ping at a second time to the first Internet address;
   f. measuring a second response time to the second ping to determine a second level of Internet traffic on the first Web page; and
   g. assigning a second value to the perceptible characteristic of the first graphical object, the second value representing the second level of Internet traffic;
   h. redisplaying on the display device the first graphical object for identifying the amount of the Web page traffic associated with the hypertext link prior to the selection thereof via the pointing icon.

2. The computer program product of claim 1 wherein the method further comprises:
   i. automatically sending a third ping at the first time to a second Internet address associated with a second Web page;
   j. measuring a third response time to the third ping to determine a third level of Internet traffic on the second Web page;
   k. assigning a third value to a perceptible characteristic of a second graphical object, the third value representing the third level of Internet traffic;
   l. displaying on the display device the second graphical object;
   m. automatically sending a fourth ping at the second time to the second Internet address;
   n. measuring a fourth response time to the fourth ping to determine a fourth level of Internet traffic on the second Web page;
   o. assigning a fourth value to the perceptible characteristic of the second graphical object, the fourth value representing the fourth level of Internet traffic;
   p. redisplaying on the display device the second graphical object.

3. The computer program product of claim 2 wherein the interval between the first time and the second time is determined according to a mathematical distribution.

4. The computer program product of claim 3 wherein the mathematical distribution is a constant time interval.

5. The computer program product of claim 3 wherein the mathematical distribution is a Gaussian distribution.

6. The computer program product of claim 3 wherein the mathematical distribution is a White Noise distribution.

7. The computer program product of claim 3 wherein the mathematical distribution is a Poisson distribution.

8. The computer program product of claim 2 wherein the method further comprises selecting the first Web page and the second Web page.

9. The computer program product of claim 8 wherein the method further comprises selecting the first Web page from a user's list of Internet addresses.

10. The computer program product of claim 9 wherein the list of Internet addresses is a one of a list of user favorite Internet addresses and a list of most recently visited Internet addresses.

11. The computer program product of claim 2 wherein the method further comprises storing the first Internet address and the second Internet address.

12. The computer program product of claim 2 wherein the perceptible characteristic of the first graphical object is a first one of color, size, shape and audio tone.

13. The computer program product of claim 12 wherein the perceptible characteristic of the second graphical object is a second one of color, size, shape and audio tone.

14. A computer program product to enable a computer device to implement a method of monitoring Web page traffic, the computer device including a display device displaying a pointing icon, the pointing icon having a perceptible characteristic, the method comprising:

a. determining whether the pointing icon points to a hypertext link including a first Internet address associated with a first Web page;
   b. automatically sending a first ping at a first time to the first Internet address in response to a determination that the pointing icon points to the hypertext link including the first Internet address associated with the first Web page;
   c. measuring a first response time to the first ping to determine a first level of Internet traffic on the first Web page;
   d. selecting from a set of ranges a first selected range including the first level of Internet traffic, the set of ranges including a first range associated with a first value of the perceptible characteristic, a second range associated with a second value of the perceptible characteristic, and a third range associated with a third value of the perceptible characteristic;
   e. displaying the pointing icon using the value of the perceptible characteristic associated with the first selected range for identifying an amount of Web page traffic associated with the hypertext link prior to the selection thereof via the pointing icon;
   f. automatically sending a second ping at a second time to the first Internet address if the pointing icon points to the hypertext link;
   g. measuring a second response time to the second ping to determine a second level of Internet traffic on the first Web page;
   h. selecting from the set of ranges a second selected range including the second level of Internet traffic;
   i. displaying the pointing icon using the value of the perceptible characteristic associated with the second selected range for identifying the amount of Web page traffic associated with the hypertext link prior to the selection thereof via the pointing icon.

15. The computer program product of claim 14 wherein the perceptible characteristic of the pointing icon is a one of color, size, shape and audio tone.

16. The computer program product of claim 14 wherein the first Web page is selected from a list of Internet addresses.

17. The computer program product of claim 16 wherein the list of Internet addresses is a one of a list of user favorite Internet addresses and a list of most recently visited Internet addresses.

18. The computer program product of claim 14 wherein the method further comprises:

j. accessing the first Web page when the Internet traffic on the first Web page is within an acceptable range.

19. A personal computer device allowing a user to connect to the Internet, comprising:

a. a display device;
   b. a processor coupled to the display device and executing instructions; and
   c. a memory device coupled to the processor and storing instructions of a method comprising:
      1. automatically sending a first ping at a first time to a first Internet address associated with a first Web page in response to a determination that a pointing icon points to a hypertext link including the first Internet address associated with the first Web page;
      2. measuring a first response time to the first ping to determine a first level of Internet traffic on the first Web page;
      3. assigning a first value to a perceptible characteristic of a first graphical object, the first value representing the first value;
      4. displaying on the display device the first graphical object for identifying an amount of Web page traffic associated with the hypertext link prior to the selection thereof via the pointing icon;
      5. automatically sending a second ping at a second time to the first Internet address;
      6. measuring a second response time to the second ping to determine a second level of Internet traffic on the first Web page;
      7. assigning a second value to the perceptible characteristic of the first graphical object, the second value representing the second level;
      8. redisplaying on the display device the first graphical object for identifying the amount of Web page traffic associated with the hypertext link prior to the selection thereof via the pointing icon.

20. A computer program product to enable a computer device to implement a method of monitoring Web page traffic, the computer device including a display device displaying a pointing icon, the method comprising:

a. determining whether the pointing icon points to a hypertext link including a Internet address associated with a Web page;
   b. automatically sending a ping to the Internet address in response to a determination that the pointing icon points to the hypertext link including the Internet address associated with the Web page;
   c. measuring a response time to the ping to determine a level of Internet traffic on the Web page; and
   d. displaying the level of Internet traffic on the Web page prior to the selection thereof via the pointing icon.

* * * * *